United States Patent Office 3,790,609
Patented Feb. 5, 1974

3,790,609
CARBOXYLIC, HYDROXY-CARBOXYLIC AND RELATED ACID MIXTURES
Joseph Z. Pasky, Oakland, Calif., assignor to Chevron Research Company, San Francisco, Calif.
No Drawing. Filed Jan. 29, 1971, Ser. No. 111,143
Int. Cl. C09f 5/10
U.S. Cl. 260—413
8 Claims

ABSTRACT OF THE DISCLOSURE

Mono- and dibasic carboxylic acid mixtures containing an organic hydroxy-acid component are purified by contacting the mixture in the liquid phase with an alkylatable arene and hydrogen fluoride at a temperature within the 0° C. to 80° C. range.

BACKGROUND OF THE INVENTION

This invention relates to a process for the improvement of unsubstituted mono- and/or dibasic saturated hydrocarbyl carboxylic acids which contain an undesirable partially oxidized carboxylic acid component in admixture with the unsubstituted acid. In another aspect, it relates to a process for the reduction of hydroxy carboxylic acids and related esters by an alkylation reaction.

PRIOR ART

The prior art is contradictory with respect to the results experienced from the Friedel-Crafts eaction of lactones with arenes (see, for example, "A Reinvestigation of the Friedel-Crafts Reduction of Lactones with Arenes," by Robert M. Koca, 1968, University Microfilms, Inc., Ann Arbor, Mich. . . . Ph. D. thesis, Case Western Reserve University, 1968). However, it appears in view of the work reported by R. Koca, ibid., that lactones in general react with alkylatable arenes under controlled reaction conditions in the presence of aluminum chloride to yield aryl substituted carboxylic acids. The resulting acids are, in general, readily cyclized to cyclic ketones by an acrylative reaction under the influence of a mineral acid. No reaction, however, occurs in the presence of aluminum chloride when an electron pair donor solvent, such as nitrobenzene, is also present. On the other hand, when sulfuric acid is substituted for aluminum chloride, no evidence of a reaction of lactone with arene is found (Koca, ibid.).

In the chemical art, naturally and synthetically produced saturated mono- and dibasic hydrocarbyl carboxylic acids are often found to be mixtures which contain hydroxy carboxylic acids, lactone and dilactone impurities which cannot be conveniently removed from the mixture. For example, in the production of carboxylic acids by the air oxidation of a hydrocarbon feed, a concurrent production of an appreciable amount of a by-product mixture of one or more lactones, dilactones, hydroxy-carboxylic acid esters and ester polymers (as from the reaction of two or more hydroxy-carboxylic acid molecules) is often experienced (see, for example, U.S. Pats. Nos. 2,452,741; 2,800,504; and 2,800,506). These partially oxidized carboxylic acid components greatly complicate and burden a process for the recovery of a hydrocarbyl acid which is more or less free of these by-products.

The improved carboxylic acids obtained by employment of the present process are in general known in the art and have many uses, including, for example, in the production of ester solvent mixtures; of synthetic fatty acid soap substituents, as replacements for the naphthenic acids of commerce, and the like.

THE INVENTION

It has now been found that a carboxylic acid of the formula $R(CO_2H)_n$ which contains an appreciable amount or more of a partially oxidized carboxylic acid component can be improved by contacting the acid in the liquid phase with an alkylatable aromatic hydrocarbon in the presence of hydrogen fluoride. The contacting should be at a temperature in the range 0° to 80° C., for a period in the range from 0.1 to 4 hours, and in the substantial absence of water of dilution. The amount of hydrogen fluoride in the contact mixture relative to the partially oxidized acid component should be in the range from about 0.2 to 100 mols per mol, preferably 0.5 to 50 mols per mol, respectively. Less than 10 mol percent of water of dilution, based upon the hydrogen fluoride, should be present in the reaction mixture; and for each mol of the component, an amount of the aromatic hydrocarbon in the range 0.5 to 25 should be present.

As a result of the treatment, the partially oxidized acid component, e.g., one or more compounds of the formula $R(OH)(CO_2H)_n$ and the ester anhydrides obtained by the inter- and/or intra-esterification reaction of the foregoing unsubstituted feed and hydroxy acids, is converted to the corresponding aryl substituted carboxylic acid. R in the above formula is a saturated hydrocarbon radical which has a carbon atom content in the range from 2 to about 25, preferably 4 to 20, and $n$ is 1 or 2, preferably 1.

Surprisingly, the present process conditions, including in particular the temperature and hydrogen fluoride catalyst, are highly selective in that no appreciable amount of ketone appears to be present in the product resulting from the process treatment. Thus, no acylation or alkylation and subsequent acylative ring closure occurs.

A correlative aspect of the present invention is a process for the production of aryl substituted acids of the formula $YR(CO_2H)$, where Y is an aryl radical and R is a saturated hydrocarbon radical as disclosed above. Satisfactory reaction conditions are analogous to those as noted above except that the liquid phase may or may not contain unsubstituted carboxylic acid or other inert diluents such as saturated hydrocarbon liquids.

The conversions resulting from the present treatment may be represented as follows:

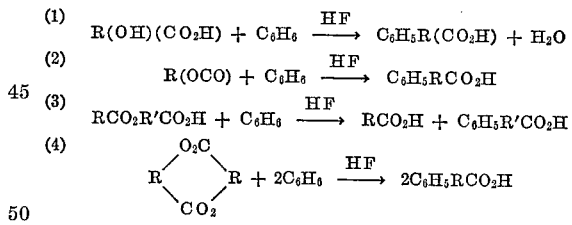

In effect, the partially oxidized acids are reduced by the present treatment.

For many purposes, including the production of ester solvents by esterification of the treated crude acid mixture, the product resulting from the above-described treatment is satisfactory with little or no additional processing. For other uses where the presence of an aryl substituted component may be objectionable, for example in a fatty acid mixture to be used as an aliphatic soap, separation of the mixture can be effected by distillation or other routine physical separation means such as crystallization and the like.

EMBODIMENT

The acid component of an oxidate obtained by air oxidizing a saturated hydrocarbon feed in the liquid phase in the presence or absence of a heavy metal catalyst (cf. U.S. Pat. Nos. 2,223,493; 2,265,948; and 2,285,601) contains a major amount of unsubstituted monobasic organic carboxylic acid and about 5–50 mol percent of a partially oxidized carboxylic acid component which includes hydroxy organic carboxylic acid, lactone and lactide. In a preferred embodiment of the present invention, one mol of the dried acid component of a $C_{16}$–$C_{30}$ n-paraffin hydrocarbon oxidate and about ten mols each of benzene and hydrogen fluoride are charged to a suitable unit, such as a copper vessel, fitted for stirring and for the exclusion of atmospheric water vapor. While maintaining the temperature of the resulting mixture at about 25–80° C., the components of the charge are contacted by stirring for about 3 hours. The stirring is discontinued and after a brief period of time, an organic phase and an inorganic phase form. The organic layer is separated from the inorganic hydrogen fluoride phase and traces of hydrogen fluoride are removed from the organic phase by water washing. After removal of excess benzene by distillation, the product of the treatment, i.e., the distillation bottoms, is mainly unsubstituted alkanoic acid and phenyl substituted alkanoic acid having a carbon atom content in the range from about 5 to 29. The neutralized $C_{12}$–$C_{16}$ fraction of this product is especially useful as a substitute for natural soap.

Where an unsubstituted alkanoic acid is the desired product, the acid component of the oxide is separated into fractions each of which has a boiling point range of not more than about 30° C. By treatment of each fraction separately with hydrogen fluoride and benzene, the hydroxy acid, lactone and lactide components are converted to the corresponding aryl substituted materials. These products have boiling points substantially higher than the unsubstituted acids facilitating separation and recovery of the purified acids by distillation. Similarly, where it is desired to treat a larger boiling point range of the acid component, an alkylatable aromatic hydrocarbon of higher molecular weight, for example, naphthalene, biphenyl, solid powdered polystyrene and the like may be used in place of benzene. In the case where polystyrene is employed, the separation is easily achieved by a simple filtration.

Satisfactory process temperatures for the practice of the present process are in general in the range 0° C. to 80° C. The employment of higher contact temperatures is relatively unsatisfactory because of undesirable side reactions. Below about 25° C. the reaction rate is slow. Hence the preferred range is 25° to 80° C.

The duration of the treatment of the feed with hydrogen fluoride and an alkylatable aromatic hydrocarbon varies depending upon a number of factors including the relative amounts of the partially oxidized component, and of hydrogen fluoride in the contact mixture and of the temperature employed. Usually a satisfactory result obtains where the treatment is continued for a period in the range 0.1 to 4 hours. In general, the desired alkylation reaction is rapid. Hence, at the first mixing of the feed and treating agents where the temperature is above 25° C., a substantial proportion, usually 5–50 mol percent, of the desired conversion occurs immediately. After a contact period of 0.5 to 1 hour, most if not all of the desired conversion will have taken place. As a practical matter, little or no advantage results from the employment of contact times in excess of about 3 hours. Additional contact time, especially at the higher temperatures, favors unwanted acylation reactions. Preferred contact times are, in general, in the range of about 0.5 to 3 hours.

The amount of hydrogen fluoride which is desirably employed in the present process may vary widely. Relative to the component to be converted, at least a minor amount (about 0.2 mol per mol of the component to be converted) of hydrogen fluoride should be present. Usually as a matter of convenience, a molar excess is included in the resulting treating mix and this amount may be as much as a 100 molar excess and higher. Satisfactory amounts, as a practical matter, are generally in the 0.5–50 mols per mol, respectively.

The amount of the alkylatable aromatic hydrocarbon satisfactory for use in the process varies. In general, for each mol of the partially oxidized acid component, the presence in the mixture of an amount of the hydrocarbon in the range 0.5 to 25 mols is ordinarily beneficial. Larger amounts may be employed advantageously, particularly where a solvent effect is desirable. Preferably, the relative amount should be in the range from about 1 to 10 mols.

The presence of water in the contact mixture is undesirable because of its adverse effect upon the hydrogen fluoride catalyst. Thus, the presence of water of dilution (e.g., water present in the process feed streams as distinguished from water produced by interactions resulting from the present treatment, see for example, Equation 1 above) should be minimal. In general, with respect to the hydrogen fluoride, the amount of water of dilution should be less than about ten mol percent, i.e., water of dilution should be substantially absent from the system, and preferably should be less than five mol percent. Most preferably the components charged to the treating process herein should be anhydrous, i.e., should contain little or no water.

Alkylatable aromatic hydrocarbons are, in general, satisfactory for use in the present treating process and are contemplated for employment herein. Aryl hydrocarbons which contain at least one hydrogen atom which is bonded to an aromatic carbocyclic carbon atom, in general, are alkylatable and are satisfactory for use in the instant process.

The aromatic hydrocarbon or aryl mixture which is desirably used in a given circumstance varies widely depending upon the object of the treatment. If a purified unsubstituted organic carboxylic acid is the desired end product, and the resulting aryl substituted carboxylic acid by-product is to be discarded, any low cost alkylatable aromatic hydrocarbon or mixture is suitable. If the aryl substituted acid is to be recovered either as a portion of the product or separately and used as the principal product, or is the principal product as where a lactone per se is to be reacted with an aromatic hydrocarbon, then the usual considerations, molecular weight, particular aryl-type requirements (phenyl, tolyl, naphthyl, and the like), etc. will govern which aromatic hydrocarbon should be employed. For example, in the production of a close homologue of the plant hormone α-toluic acid, benzene and lactide (3,6 - dimethyl-2,5-p-dioxanedione) would be the combination of reactants employed for that purpose. If the use of a relatively low treating temperature is believed to be desirable and it is advantageous to avoid the liquid-solid heterogeneous type of reaction system, an aromatic hydrocarbon having a low melting point, for example toluene, is satisfactory. On the other hand and particularly where the amount of the hydroxy acid or ester anhydride component of the feed mixture is relatively minor, the use of an insoluble solid alkylatable aromatic hydrocarbon such as a comminuted aryl substituted polymer is especially convenient. A simple filtration permits avoidance of the elevated temperatures ordinarily required for a fractional distillation.

Especially satisfactory alkylatable aromatic hydrocarbons suitable for use in the present invention includes: (1) those which have an aromatic carbocyclic carbon atom content in the range 6 to 14, a total carbon atom content in the range from 6 to 25, preferably 6 to 20, and have at least one hydrogen atom bonded to an aromatic carbocyclic carbon atom, and (2) polystyrene.

Representative alkylatable aromatic hydrocarbons satisfactory for use in the intsant process include benzene, toluene, xylene, ethylbenzene, cumene, mesitylene, naphthalene, biphenyl, polystyrene, and the like hydrocarbons.

Unsubstituted organic carboxylic acids of the formula $R(CO_2H)_n$ having in admixture therewith at least an appreciable amount (0.2 mol percent) of a partially oxidized organic carboxylic acid component, that is of the group which includes hydroxy carboxylic acids of the formula $R(OH)(CO_2H)_n$ and the inter- and intra-esterification products of the above hydroxy acids and unsubstituted acids, are improved by the present process and are contemplated for use herein, where in the above formula R is a saturated hydrocarbon radical having a carbon atom content in the range from 2 to 25 and $n$ is in the range 1–2, inclusive. Hydrocarbon oxidation products which contain from about 0.5 to 50 mol percent of a partially oxidized organic carboxylic acid component are in general particularly advantageous feeds for the process herein. Where purification is the primary objective, the feed will in general contain less than 1 mol of the partially oxidized component per mol of the unsubstituted acid. Thus, for each mol of the latter, the relative amount of the partially oxidized impurity will be in the range 0.2–1 mol, preferably 0.5 to 1.

In the correlative aspect of the invention the aforedescribed compounds included in the group of the partially oxidized organic carboxylic acid components, individually and in mixtures, per se, are contemplated as feeds for the production of aryl substituted carboxylic acids of the formula $YR(CO_2H)_n$, where R and $n$ are as noted above and Y is an alkylatable aromatic hydrocarbon radical obtained by the removal of a single hydrogen atom from a carbocyclic carbon atom of an alkylatable aromatic hydrocarbon, as defined above.

R of the above formulated process feed compounds may be any saturated hydrocarbon radical, acyclic or cyclic, and all such compounds and mixtures thereof are contemplated for use herein. Preferably R of the above formulated process feed compounds is a saturated straight chain hydrocarbon radical having a hydrocarbon atom content in the range from 4 to 20, and of these the most preferable process feeds are those obtained by the liquid phase air oxidation of paraffinic hydrocarbons having a carbon atom content in the range from about 10 to 30.

The phenyl substituted n-alkanoic acids obtained in the instant process, wherein benzene or toluene and a lactone of formula

where R is a $C_8$–$C_{14}$ straight chain hydrocarbon radical, in the base neutralized form, are especially useful substitutes for the oil soluble naphthenic acid salts of commerce.

Representative carboxylic acid feeds which are improved by the instant process include the complex saturated hydrocarbon oxidates noted above as well as fractions of these oxidates. In either case, unconverted saturated hydrocarbon may or may not also be present depending upon ordinary requirements of convenience, i.e., ease of handling, reactor volume limitations, and the like.

Representative individual partially oxidized carboxylic acid feeds satisfactory for use in the production of aryl substituted alkanoic acids include α-valerolactone, α-hydroxyvaleric acid, α-n-valerolactone, 2 - ethyl-α-n-valerolactone, α-butyrolactone, pivololactone, hexahydrophthalide, 2-ethyl-5-hydroxy-n-hexadecanoic acid, 5-hydroxy-n-eicosanoic acid, and the like partially oxidized saturated carboxylic acids and their lactone, dilactone and linear ester derivatives.

The following examples further illustrate the invention.

Example 1

Into a copper pressure autoclave were charged γ-decalactone, benzene and anhydrous hydrogen fluoride in the mol ratio of 1:10:50. The autoclave was fitted with a reflux condenser, a stirring means and a pressure relief valve. Periodically the course of the reaction was determined by removing an aliquot of the mixture from the reactor and analyzing it using a vapor phase chromatographic unit. After a reaction period of 2 hours during which time the autoclave and content was maintained at 15–20° C., only 5 percent of the lactone had reacted. The temperature was then raised to 55–60° C. After one hour at this latter temperature, the chromatograph indicated that the lactone had been completely converted to a product having a boiling point about 50° C. higher than that of the decalactone feed. The resulting product was then freed of hydrogen fluoride and analyzed by infrared. The spectra showed the strong adsorption at 1720 cm.$^{-1}$, which is characteristic of an aliphatic acid. It did not show adsorption at 1785 cm.$^{-1}$, which is characteristic of a γ-lactone. Thus, these data demonstrated that the lactone had been substantially quantitatively converted to phenyl decanoic acid.

The foregoing example demonstrates that lactones, as disclosed above, are effectively converted to the corresponding aryl substituted carboxylic acids by contact of the lactone feed with an alkylatable aromatic hydrocarbon in the liquid phase in the presence of hydrogen fluoride in a reaction which is slow but appreciably below about 25° C. and which proceeds readily and to completion after a period of one hour at 60° C.

Example 2

As in Example 1, a charge using the same proportions of reactants and catalyst was introduced into the described autoclave reaction vessel except that about 3 mols of n-hexanoic acid per mol of the lactone were included in the charge. A temperature of 40° C. was maintained for a period of 6 hours and as in Example 1, aliquots were periodically removed and analyzed. The data showed the disappearance of the γ-lactone and the appearance of phenyl substituted decanoic acid as the reaction progressed. In addition each succeeding sample analysis showed a constant, unchanging hexanoic acid content and the absence of the infrared spectral peaks attributable to pentyl phenyl ketone or to the cyclic ketone which results had there been any acylative ring closure of the desired phenyl decanoic acid product. The data from the final analysis indicated that the conversion of lactone feed to phenyl decanoic acid exceeded 98 mol percent.

Example 2 demonstrates that in the treatment of mixtures of unsubstituted saturated organic carboxylic acids and lactones with an alkylatable aromatic hydrocarbon in the presence of hydrogen fluoride, there is a selective reaction of the lactone with the arene hydrocarbon.

Example 3

As in Example 1, a charge was introduced into the described autoclave except that an oxidate fraction was substituted for the lactone of the charge. The molecular portions of benzene, hydrogen fluoride, and organic carboxylic acids feed were otherwise comparable. The oxidate was obtained by an uncatalyzed air oxidation of octadecane. The fraction used was the $C_{10}$–$C_{13}$ cut obtained by fractional distillation of the oxidate and comprised the usual lactone, hydroxy alkanoic acid, and alkanoic acid product mixture normally obtained by such an air oxidation followed by distillation. After a period of 3 hours at 50° C., the reaction product was freed of hydrogen fluoride and analyzed. The infrared spectra showed that over 96% of the partially oxidized organic acid component of this fraction had been converted to phenyl alkanoic acid. Similar results are also obtained when the dried crude oxidate per se or the dried oxidate less the unconverted saturated hydrocarbon feed are substituted for the oxidate fraction of the Example 3.

Example 3 demonstrates that the hydroxy carboxylic acids and the corresponding ester and lactone components of the product of an air or oxygen oxidation of a saturated hydrocarbon are effectively converted to the corresponding aryl substituted alkanoic acids by treatment of all or part of the oxidate with an alkylatable aromatic hydrocarbon in the presence of hydrogen fluoride as in the present process.

What is claimed is:

1. The process for the improvement of a mixture consisting essentially of one or more acids of the formula $R(CO_2H)_n$ and an appreciable amount or more of at least one component of the group of partially oxidized acids consisting of hydroxy acids of the formula $$R(OH)(CO_2H)_n$$

and the esters obtained from the inter- or intra-esterification or lactonization of said acids and hydroxy acids, wherein for said formulae R is a saturated hydrocarbon radical having a carbon atom content in the range from about 2 to 25, and $n$ is 1 or 2, which comprises converting the partially oxidized acid component of said mixture to aryl substituted alkanoic acids by contacting the mixture in the liquid phase with an alkylatable aryl hydrocarbon in the presence of hydrogen fluoride at a temperature in the range from about 0° C. to 80° C. for a period in the range from about 0.1 to 4 hours; wherein for each mol of said acid component, the mixture contains an amount of the aryl hydrocarbon in the range from about 0.5 to 25 mols, and of hydrogen fluoride in the range from about 0.2 to 100 mols; said contact mixture containing, based upon the hydrogen fluoride, less than about 10 mol percent of water of dilution; said aryl hydrocarbon being selected from the group consisting of aryl hydrocarbons containing at least one replaceable aromatic hydrogen atom and having an aromatic carbocyclic carbon atom content in the range from 6 to about 14, and a total carbon atom content in the range from 6 to about 25, and polystyrene.

2. The process as in claim 1 for each mol of said component an amount of hydrogen fluoride in the range from about 0.5 to 50 mols is present in the contact mixture, wherein $n$ of said formulae is 1 and said R have a carbon atom content in the range 4 to 20, wherein said temperature is in the range 25° C. to 80° C., wherein said contacting is for a period in the range 0.5 to 3 hours; wherein said aromatic hydrocarbon has a carbon atom content in the range 6 to 20 and is present in an amount in the range 1 to 10 mols; wherein said contact mixture is substantially anhydrous; and wherein the amount of the component per mol of the acid of the formula $R(CO_2H)_n$ is in the range 0.1–1 to 1 respectively.

3. The process as in claim 2 wherein said R is straight chain hydrocarbon groups.

4. The process as in claim 1 wherein said mixture is a hydrocarbon oxidation product having a content of said partially oxidized acid component in the range 0.5 to 50 mol percent.

5. The process for the production of an aryl substituted alkanoic acid, which comprises reacting a lactone with an alkylatable aromatic hydrocarbon by maintaining a mixture of said reactants in the liquid phase in the presence of hydrogen fluoride at a temperature in the range from 0° C. to 80° C. for a period in the range from about 0.1 to 4 hours, wherein for each mol of said lactone the mixture contains an amount of the hydrocarbon in the range from about 0.5 to 25 mols and an amount of hydrogen fluoride in the range from about 0.5 to 50 mols; said lactone being of the formula

wherein R is a straight chain hydrocarbon radical having a carbon atom content in the range from 4 to 20; and said aromatic hydrocarbon being selected from the group consisting of aryl hydrocarbons containing at least one replaceable aromatic hydrogen atom and having an aromatic carbocyclic carbon atom content in the range from 6 to about 14, and a total carbon atom content in the range from 6 to about 20; said reaction mixture containing an amount of water of dilution, based upon the hydrogen fluoride, of less than 10 mol percent.

6. The process of claim 5 wherein said R has a carbon atom content in the range from 8 to 14.

7. The process as in claim 5 wherein said lactone is decalactone.

8. The process as in claim 1 wherein said R is straight chain hydrocarbon groups having a carbon atom content in the range 10–13, wherein said aromatic hydrocarbon is benzene, wherein for each mol of said mixture about 10 mols of benzene and 50 mols of hydrogen fluoride are present; wherein said temperature is about 50° C. and wherein said reaction period is about 3 hours.

References Cited
UNITED STATES PATENTS

| | | | |
|---|---|---|---|
| 2,475,916 | 7/1949 | Reiff et al. | 260—413 |
| 2,859,251 | 11/1958 | Linn | 260—515 X |
| 2,275,312 | 3/1942 | Tinker et al. | 260—413 X |
| 2,587,540 | 2/1952 | Shaver | 260—515 |
| 2,589,223 | 3/1952 | Burtner | 260—520 |

FOREIGN PATENTS

| | | | |
|---|---|---|---|
| 810,087 | 3/1959 | Great Britain | 260—413 |

LEWIS GOTTS, Primary Examiner

E. G. LOVE, Assistant Examiner

U.S. Cl. X.R.

260—515 R, 515 P, 537 R